(12) United States Patent
Sachdev et al.

(10) Patent No.: US 8,317,253 B2
(45) Date of Patent: Nov. 27, 2012

(54) VEHICLE DOOR ASSEMBLY

(75) Inventors: Anil K. Sachdev, Rochester Hills, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/053,400

(22) Filed: Mar. 22, 2011

(65) Prior Publication Data

US 2012/0242107 A1 Sep. 27, 2012

(51) Int. Cl.
*B60J 5/00* (2006.01)

(52) U.S. Cl. ............. 296/146.5; 296/146.2; 296/193.06; 49/502; 49/459

(58) Field of Classification Search ............... 296/146.2, 296/146.3, 146.5, 193.06; 49/502, 459
See application file for complete search history.

(56) References Cited

U.S. PATENT DOCUMENTS

| | | | |
|---|---|---|---|
| 4,993,775 A * | 2/1991 | Keys | 296/201 |
| 7,125,067 B2 * | 10/2006 | Bonnett et al. | 296/146.6 |
| 7,581,779 B2 * | 9/2009 | Baumgart et al. | 296/146.5 |
| 2006/0123708 A1 * | 6/2006 | Fuetterer et al. | 49/502 |
| 2008/0238134 A1 * | 10/2008 | Guellec | 296/146.2 |
| 2011/0113697 A1 * | 5/2011 | Sachdev et al. | 49/502 |
| 2011/0167732 A1 * | 7/2011 | Brancaleone et al. | 49/475.1 |

FOREIGN PATENT DOCUMENTS

| | | |
|---|---|---|
| DE | 4008111 A1 | 9/1991 |
| DE | 19962988 A1 | 5/2000 |
| DE | 19920841 A1 | 11/2000 |

\* cited by examiner

*Primary Examiner* — Dennis Pedder
(74) *Attorney, Agent, or Firm* — Quinn Law Group, PLLC

(57) ABSTRACT

A door assembly for a vehicle includes an outer panel configured for defining an exterior surface of the vehicle, and an inner panel matable to the outer panel to define a cavity therebetween. The inner panel includes a lower portion having a first longitudinal axis and a B-pillar assembly extending from the lower portion. The B-pillar assembly includes a casting having an external surface configured for defining the exterior surface of the vehicle, an internal surface spaced apart from the external surface, a length, and a second longitudinal axis. The casting extends from the portion along the second longitudinal axis, and the second longitudinal axis is substantially perpendicular to the first longitudinal axis.

15 Claims, 5 Drawing Sheets

VEHICLE DOOR ASSEMBLY

TECHNICAL FIELD

The present disclosure generally relates to a door assembly for a vehicle.

BACKGROUND

Vehicles, such as automotive passenger vehicles, generally include multiple components and subsystems. For example, vehicles may include two or more door assemblies and three or more pillars that visually and/or structurally separate adjacent door assemblies from one another and from other vehicle components. Such multiple components and subsystems may contribute to increased manufacturing complexity and/or vehicle weight.

Further, components that define an exterior surface of the vehicle must often meet specific appearance, strength, and durability requirements. Components which do not meet such requirements may be altered and/or covered, for example by a decorative appliqué, which may further contribute to increased manufacturing complexity and/or vehicle weight.

SUMMARY

A door assembly for a vehicle includes an outer panel configured for defining an exterior surface of the vehicle, and an inner panel matable to the outer panel to define a cavity therebetween. The inner panel includes a lower portion having a first longitudinal axis and a B-pillar assembly extending from the lower portion. The B-pillar assembly includes a casting having an external surface configured for defining the exterior surface of the vehicle, an internal surface spaced apart from the external surface, a length, and a second longitudinal axis. The casting extends from the lower portion along the second longitudinal axis, and the second longitudinal axis is substantially perpendicular to the first longitudinal axis.

In one embodiment, the casting is integral with the lower portion and integrally extends from the lower portion along the second longitudinal axis. The inner panel further includes a mirror mounting element integral with and extending from the lower portion. The B-pillar assembly extends from the lower portion and is spaced apart from the mirror mounting element to at least partially define a window opening. Further, the B-pillar assembly includes a member configured for attaching to the internal surface along the length of the casting. The door assembly also includes a header configured for joining the mirror mounting element to the casting to thereby further define the window opening.

In another embodiment, the casting is separately attachable to the lower portion and includes a flange configured for attachment to the lower portion. The inner panel further includes a mirror mounting element integral with and extending from the lower portion. The B-pillar assembly extends from the lower portion and is spaced apart from the mirror mounting element to at least partially define a window opening. Further, the B-pillar assembly includes a member configured for attaching to the internal surface along the length of the casting. The door assembly also includes a header configured for joining the mirror mounting element to the casting to thereby further define the window opening.

The above features and advantages and other features and advantages of the present disclosure are readily apparent from the following detailed description of the best modes for carrying out the disclosure when taken in connection with the accompanying drawings.

DETAILED DESCRIPTION

Figure 1:
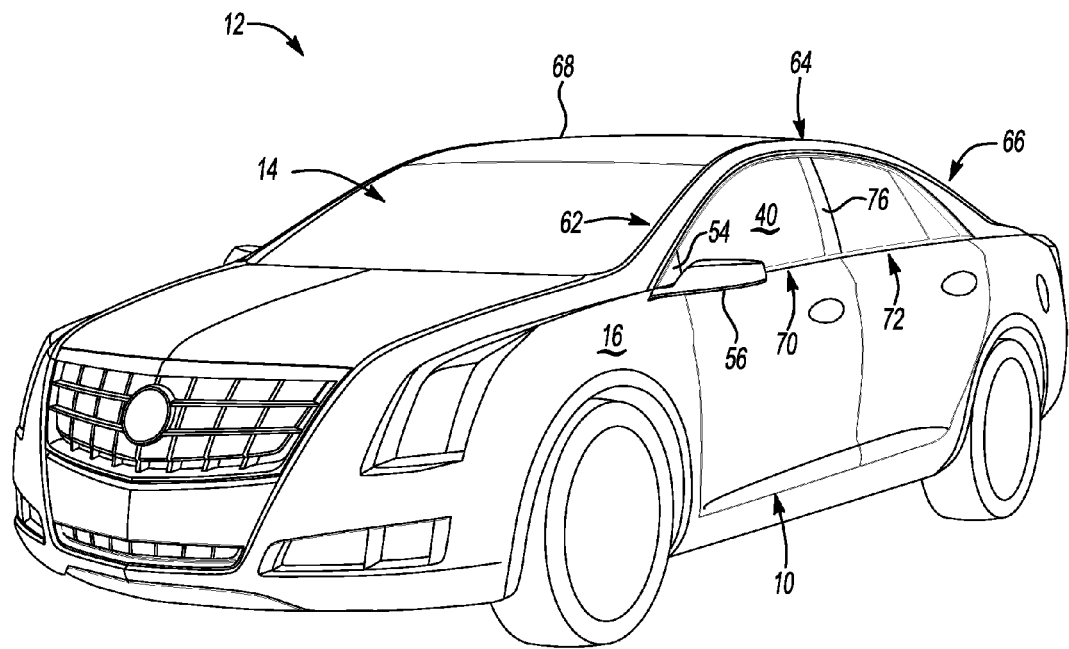
FIG. 1 is a schematic perspective illustration of a vehicle including a door assembly.

Referring to the Figures, wherein like reference numerals refer to like elements, a door assembly 10 for a vehicle 12 is shown generally in FIG. 1. The door assembly 10 may be useful for automotive vehicles configured for transporting passengers and/or cargo. However, the door assembly 10 may also be useful for non-automotive applications including recreational vehicles, construction vehicles, and other transportation and industrial applications.

Directional terminology used herein pertaining to the vehicle 12 is understood by one skilled in the art. For example, terminology such as "front", "forward", and "fore" generally refers to a leading portion of the vehicle 12 with respect to a direction of vehicle travel. Likewise, terminology such as "rear", "rearward", and "aft" generally refers to a trailing portion of the vehicle 12 with respect to the direction of vehicle travel. In addition, those having ordinary skill in the art will recognize that terms such as "above", "below", "upper", "lower", "upward", "downward", et cetera, are used descriptively of the Figures and elements, and do not represent limitations on the scope of the invention, as defined by the appended claims. As shown in FIG. 1, the vehicle 12 defines an interior passenger compartment (shown generally at 14), and components not disposed within the passenger compartment 14 are generally referenced as an exterior surface 16 or body of the vehicle 12.

Figure 2:
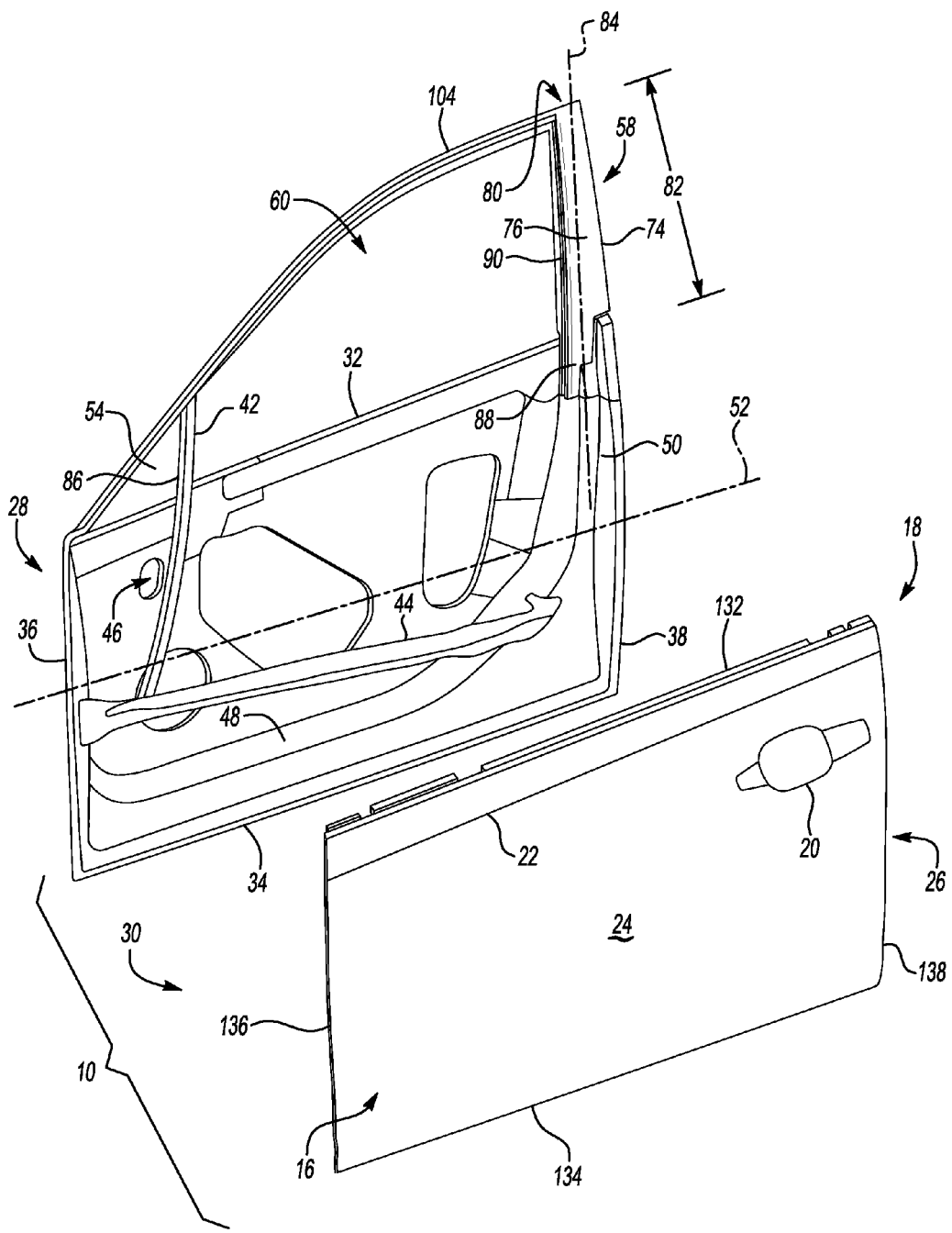
FIG. 2 is a schematic perspective exploded illustration of one embodiment of the door assembly of FIG. 1 when viewed from an exterior of the vehicle, including an outer panel and an inner panel, wherein the inner panel includes a B-pillar assembly.

Referring now to FIGS. 1 and 2, the door assembly 10 includes an outer panel 18 (FIG. 2) configured for defining the exterior surface 16 of the vehicle 12. For example, the outer panel 18 may be formed from sheet metal or a composite, and may include styling details specific to the vehicle 12, such as door handle cutouts 20 and body molding 22. Further, the outer panel 18 may have an outer surface 24 and an inner surface 26 (best shown in FIG. 3) spaced apart from the outer surface 24. The outer surface 24 may be characterized as a "Class A" surface, i.e., suitable in both durability and appearance for forming and defining the exterior surface 16 (FIG. 1) of the vehicle 12. That is, the outer surface 24 may be visible from the exterior of the vehicle 12 when viewed from a vantage point that is outside of the passenger compartment 14 (FIG. 1). As such, the outer panel 18 may be coated with an automotive exterior coating system, which may include one or more of an anodized coating, an electrocoat coating, a primer coating, a topcoat coating, and a clearcoat coating.

Figure 3:
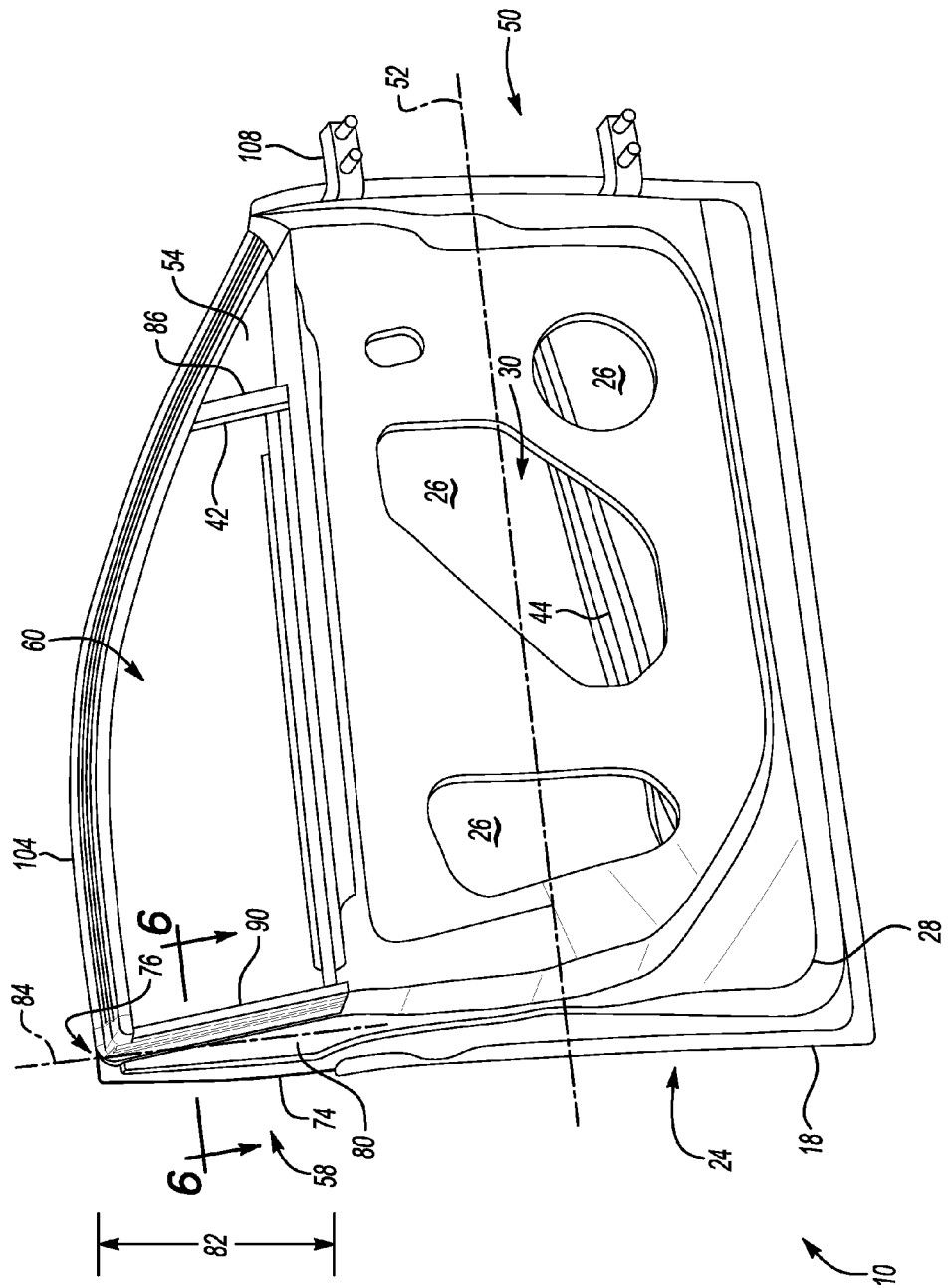
FIG. 3 is a schematic perspective illustration of another embodiment of the door assembly of FIG. 1 when viewed from an interior of the vehicle.
Figure 4:
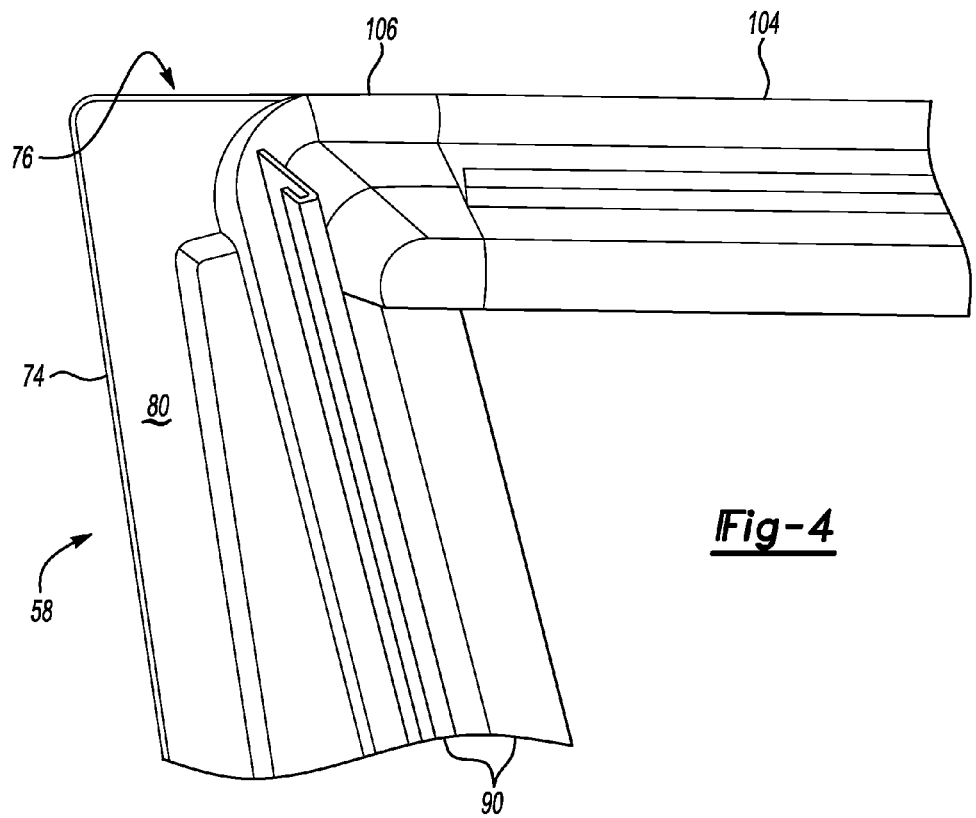
FIG. 4 is a schematic perspective fragmentary illustration of the B-pillar assembly of FIGS. 1-3.

Referring to FIGS. 2 and 3, the door assembly 10 also includes an inner panel 28 matable to the outer panel 18 to define a cavity 30 (FIG. 3) therebetween. Therefore, the inner panel 28 may have a shape that is generally complementary to the shape of the outer panel 18. For example, as best shown in FIG. 2, both the inner panel 28 and the outer panel 18 may have a generally rectangular shape and define respective upper and lower edges 32, 34, 132, 134, and fore and aft edges 36, 38, 136, 138. The inner panel 28 may be hemmed, for example, to the outer panel 18 along each of the fore, lower, and aft edges 36, 34, 38 to thereby define the cavity 30 between the inner panel 28 and the outer panel 18. The cavity 30 may provide storage and support for hardware, components, and subsystems of the vehicle 12, such as, but not limited to, window glass 40 (FIG. 1), electronics (not shown), a window retraction guide 42 (FIG. 2), a window lift mechanism (not shown), a latching and unlatching mechanism (not shown), and a door reinforcement element 44 (FIG. 2). As such, as shown in FIG. 2, the inner panel 28 may define voids 46 and/or protrusions 48 to accommodate the hardware, components, and subsystems.

As shown in FIG. 2, the inner panel 28 may not be hemmed to the outer panel 18 along the respective upper edges 32, 132 so that the window glass 40 may translate into and out of the cavity 30 during operation, as set forth in more detail below. Further, the respective upper edges 32, 132 of the inner and outer panels 28, 18 may generally define a waistline or belt line of the vehicle 12. That is, as used herein, the terminology "waistline" or "belt line" refers to a line directly below the front and rear side windows 70, 72 (FIG. 1) of the vehicle 12.

With continued reference to FIG. 2, the inner panel 28 includes a lower portion 50 having a first longitudinal axis 52. The lower portion 50 may be disposed below the waistline or belt line of the vehicle 12, and the first longitudinal axis 52 may be disposed generally parallel to a direction of vehicle travel. That is, the first longitudinal axis 52 may extend from the fore edge 36 to the aft edge 38 of the inner panel 28. The lower portion 50 of the inner panel 28 may be configured to mate with the outer panel 18, as shown in FIG. 3.

As best shown in FIGS. 2 and 3, the inner panel 28 may also include a mirror mounting element 54 extending from the lower portion 50. That is, the mirror mounting element 54 may be disposed above the waistline or belt line of the vehicle 12. The mirror mounting element 54 may be integral with the lower portion 50 and may be configured to receive and support an exterior side-view mirror 56 (FIG. 1) of the vehicle 12. In one non-limiting example, the mirror mounting element 54 may be integrally cast with the inner panel 28.

With continued reference to FIGS. 2 and 3, the inner panel 28 further includes a B-pillar assembly 58 extending from the lower portion 50. That is, the B-pillar assembly 58 may also be disposed above the waistline or belt line of the vehicle 12. The B-pillar assembly 58 may be spaced apart from the mirror mounting element 54 to at least partially define a window opening 60. As used herein, the terminology "B-pillar" refers to a second of three or more pillars (shown generally at 62, 64, and 66, respectively, in FIG. 1) of the vehicle 12. As understood by one skilled in the art, the B-pillar 64 generally supports a roof 68 (FIG. 1) of the vehicle 12 and separates the front and rear side windows 70, 72 (FIG. 1) of the vehicle 12. Therefore, the B-pillar assembly 58 of the inner panel 28 is generally configured to align with the B-pillar 64 of the vehicle 12 when the door assembly 10 is disposed in a closed position. As such, the door assembly 10 may be a front driver-side or passenger-side door assembly of the vehicle 12.

Referring now to FIGS. 2-6, the B-pillar assembly 58 includes a casting 74. As used herein, the terminology "casting 74" refers to a product formed through a casting process that includes forcing molten metal under high pressure into a mold cavity machined into a die. Alternatively, molten metal may be gently poured into a mold cavity prepared from sand or into a mold cavity machined into a die. The casting 74 may be cast and formed from any suitable metal, e.g., magnesium, aluminum, and combinations or alloys thereof.

As best shown in FIG. 2, the casting 74 has an external surface 76 configured for defining the exterior surface 16 (FIG. 1) of the vehicle 12, as set forth in more detail below. That is, the external surface 76 is suitable in both appearance and durability for forming and defining the exterior surface 16 of the vehicle 12. Stated differently, the external surface 76 of the casting 74 is a "Class-A" surface. Therefore, the door assembly 10 may further include a thin coating 78 (FIG. 6), e.g., paint, disposed on the external surface 76 of the casting 74. For example, the coating 78 may include one or more of the group of an anodized coating, an electrocoat coating, a primer coating, a topcoat coating, and a clearcoat coating. That is, the external surface 76 of the casting 74 may be coated, e.g., to enhance an oxidation-resistance of the casting 74, but need not be covered with a masking, e.g., an appliqué, that obscures or hides the external surface 76 of the casting 74 from view when viewed from an exterior of the vehicle 12.

As best shown in FIG. 3, the casting 74 also has an internal surface 80 spaced apart from the external surface 76, a length 82, and a second longitudinal axis 84. The internal surface 80 of the casting 74 is configured to face the passenger compartment 14 (FIG. 1) of the vehicle 12, and is spaced opposite the external surface 76. The second longitudinal axis 84 extends along the length 82 of the casting 74.

Referring to FIGS. 2 and 3, the casting 74 extends from the lower portion 50 of the inner panel 28 along the second longitudinal axis 84, and the second longitudinal axis 84 is substantially perpendicular to the first longitudinal axis 52. That is, the casting 74 extends away from the lower portion 50 in a direction substantially perpendicular to the lower portion 50 of the inner panel 28. Therefore, as set forth above and described with reference to FIGS. 2 and 3, the casting 74 may be spaced apart from the mirror mounting element 54 to at least partially define the window opening 60. For example, the mirror mounting element 54 may be triangular and have an edge 86 disposed substantially parallel to the second longitudinal axis 84. In this non-limiting variation, the casting 74 extends from the lower portion 50 of the inner panel 28 and is spaced apart from the edge 86 of the mirror mounting element 54 to thereby at least partially define the window opening 60. Although dependent on specific styling of the vehicle 12, the window opening 60 (FIGS. 2 and 3) may be shaped to receive the window glass 40 (FIG. 1).

In one embodiment shown in FIG. 3, the casting 74 may be integral with the lower portion 50. That is, both the casting 74 and the lower portion 50 of the inner panel 28 may be integrally-formed, e.g., during a casting process. In another embodiment described with reference to FIG. 2, the casting 74 may be separately attachable to the lower portion 50. That is, the casting 74 may be independent from the lower portion 50 and configured for attachment to the lower portion 50. For example, in a non-limiting variation, the casting 74 may include a flange 88 (FIG. 2) configured for attachment to the lower portion 50. That is, the flange 88 may be configured to facilitate a separate attachment to the lower portion 50. In this embodiment, the casting 74 and the lower portion 50 are separately formed, e.g., during separate casting processes.

Referring now to FIGS. 2-6, the B-pillar assembly 58 may include a member 90 configured for attaching to the internal surface 80 along the length 82 (FIG. 3) of the casting 74. The member 90 may be an extrusion. That is, in contrast to the casting 74, the member 90 may be formed by an extrusion process that includes forming or shaping a material, e.g., metal or plastic, by pushing and/or drawing the material through an opening of a desired cross-section and shape. The member 90 may be extruded and formed from any suitable metal, e.g., magnesium, aluminum, and combinations or alloys thereof.

Figure 5:
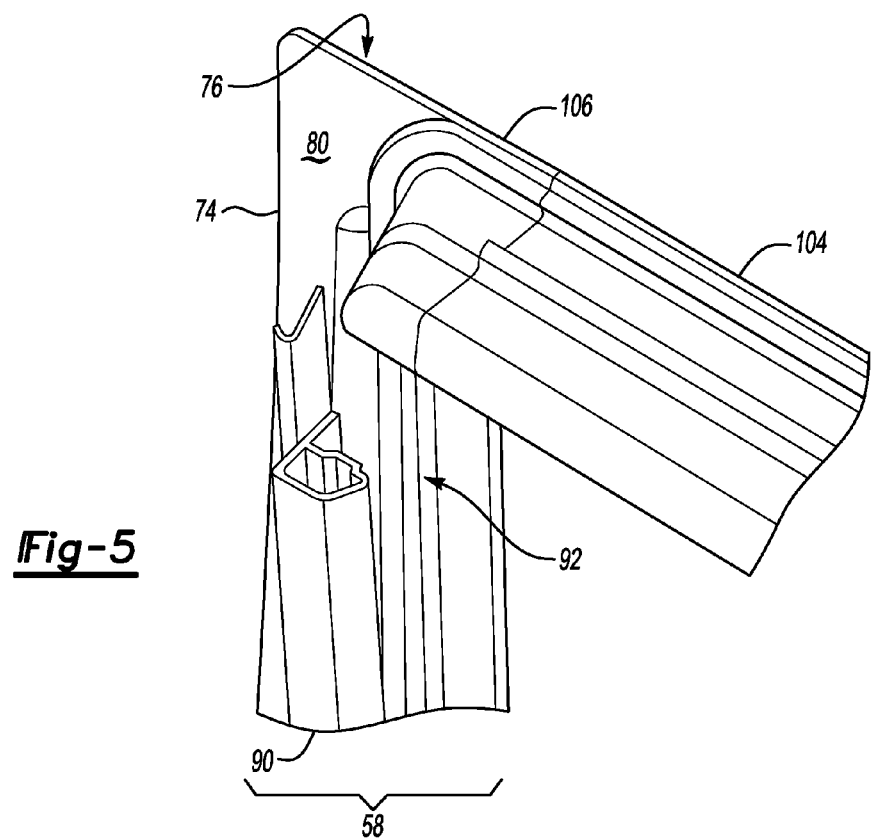
FIG. 5 is a schematic perspective exploded fragmentary illustration of the B-pillar assembly of FIGS. 1-4.
Figure 6:
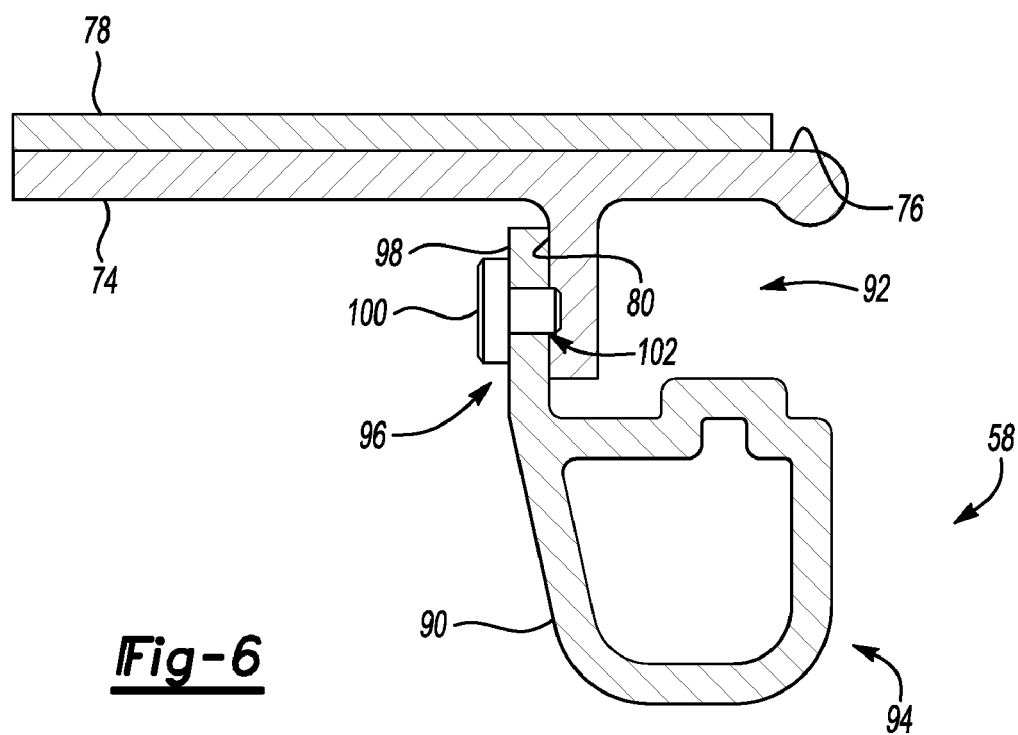
FIG. 6 is a schematic cross-sectional illustration of the B-pillar assembly of FIG. 3 taken along section lines 6-6.

As best shown in FIGS. 5 and 6, the member 90 may be shaped to define a guide channel 92 and/or seal for the window glass 40 (FIG. 1) of the vehicle 12. Therefore, referring to FIG. 6, the member 90 may include a first longitudinal portion 94 integral with a second longitudinal portion 96. The first longitudinal portion 94 may be hollow, and the second longitudinal portion 96 may extend from the first longitudinal portion 94 to define an attachment appendage 98 configured for attaching to the casting 74 along the length 82 (FIG. 3) of the casting 74. When assembled, the member 90 may be attached to the internal surface 80 of the casting 74, and the member 90 and casting 74 may together define the guide channel 92, as shown in FIG. 6. In operation, the window glass 40 (FIG. 1) may translate from within the cavity 30 (FIG. 3) defined by the mated inner panel 28 and outer panel 18 along the guide channel 92 (FIG. 6) to raise and lower the window glass 40 within the door assembly 10.

Referring to FIG. 6, the member 90 may attach to the casting 74 in any suitable manner. As non-limiting examples, the member 90 may be riveted, welded, adhesive bonded, and/or bolted to the casting 74. In one variation described with reference to FIG. 6, the B-pillar assembly 58 further includes a rivet 100 integral with the casting 74. In this variation, the member 90 may define one or more holes 102, and the member 90 may receive the rivet 100 and thereby attach to the casting 74. Further, a corrosion sleeve or grommet (not shown) may be disposed between the rivet 100 and the member 90 to minimize galvanic corrosion of the casting 74, the rivet 100, and/or the member 90. Alternatively, although not shown, the rivet 100 may be separate from, i.e., not integral with, the casting 74.

Referring again to FIGS. 2 and 3, the door assembly 10 may also include a header 104 configured for joining the mirror mounting element 54 to the casting 74 to thereby further define the window opening 60. The header 104 may therefore span and enclose the window opening 60. Although dependent on vehicle styling, the header 104 may be curvilinear and interconnect the mirror mounting element 54 and the casting 74. For example, referring to FIGS. 2-5, the header 104 may join to a distal portion 106 (FIGS. 4 and 5) of the casting 74, extend generally downward toward the lower portion 50 (FIGS. 2 and 3), and join to the mirror mounting element 54 (FIGS. 2 and 3) to thereby bridge and enclose the window opening 60 (FIGS. 2 and 3).

Referring again to FIG. 3, in one non-limiting embodiment, the door assembly 10 includes the outer panel 18 and the inner panel 28 matable to the outer panel 18 to define the cavity 30 therebetween. The inner panel 28 includes the lower portion 50 having the first longitudinal axis 52, the mirror mounting element 54 integral with and extending from the lower portion 50, and the B-pillar assembly 58 extending from the lower portion 50 and spaced apart from the mirror mounting element 54 to at least partially define the window opening 60. The B-pillar assembly 58 includes the casting 74 integral with the lower portion 50. The casting 74 has the external surface 76 configured for defining the exterior surface 16 of the vehicle 12, the internal surface 80 spaced apart from the external surface 76, the length 82, and the second longitudinal axis 84.

With continued reference to FIG. 3, in this embodiment, the casting 74 integrally extends from the lower portion 50 along the second longitudinal axis 84, and the second longitudinal axis 84 is substantially perpendicular to the first longitudinal axis 52. That is, the casting 74 is not separately attachable to the lower portion 50, but is rather integrally cast to extend from the lower portion 50.

Referring to FIG. 3, the B-pillar assembly 58 also includes the member 90 configured for attaching to the internal surface 80 along the length 82 of the casting 74. The door assembly 10 further includes the header 104 configured for joining the mirror mounting element 54 to the casting 74 to thereby further define the window opening 60.

In another non-limiting embodiment described with reference to FIG. 2, the door assembly 10 includes the outer panel 18 and the inner panel 28 matable to the outer panel 18 to define the cavity 30 therebetween. The inner panel 28 includes the lower portion 50 having the first longitudinal axis 52, the mirror mounting element 54 integral with and extending from the lower portion 50, and the B-pillar assembly 58 extending from the lower portion 50 and spaced apart from the mirror mounting element 54 to at least partially define the window opening 60. The B-pillar assembly 58 includes the casting 74. The casting 74 has the external surface 76 configured for defining the exterior surface 16 of the vehicle 12, the internal surface 80 spaced apart from the external surface 76, the length 82, and the second longitudinal axis 84.

With continued reference to FIG. 2, in this embodiment, the casting 74 is separately attachable to the lower portion 50, and includes the flange 88 configured for attachment to the lower portion 50. That is, the casting 74 is not integral with the lower portion 50, but is rather separately cast and attached to the lower portion 50 to extend therefrom. The casting 74 extends from the lower portion 50 along the second longitudinal axis 84, and the second longitudinal axis 84 is substantially perpendicular to the first longitudinal axis 52. The B-pillar assembly 58 also includes the member 90 configured for attaching to the internal surface 80 along the length 82 of the casting 74. The door assembly 10 also includes the header 104 configured for joining the mirror mounting element 54 to the casting 74 to thereby further define the window opening 60.

Referring again to FIGS. 1-3, when assembled, the inner panel 28 mates to the outer panel 18, and the casting 74 of the B-pillar assembly 58 extends from the lower portion 50 of the inner panel 28. As set forth above, the casting 74 may be integral with the lower portion 50 or may be separately attached to the lower portion 50, for example by the flange 88 (FIG. 2). The member 90 is attached to the inner surface 26 along the length 82 of the casting 74, e.g., by one or more rivets 100 (FIG. 6), and the header 104 is joined to the mirror mounting element 54 and the casting 74 to further define the window opening 60. Further, the door assembly 10 may pivotably attach to the vehicle 12 (FIG. 1), e.g., with a plurality of hinges 108 (FIG. 3), so that the door assembly 10 is operable to a first, open position to allow ingress and egress from the vehicle 12 and a second, closed position to enclose the passenger compartment 14 (FIG. 1) of the vehicle 12.

Therefore, as best shown in FIGS. 1 and 2, the external surface 76 of the casting 74 and the outer panel 18 (FIG. 2) may together define the exterior surface 16 of the vehicle 12. For example, the external surface 76 may be adjacent and generally coplanar with the outer panel 18 of the door assembly 10. That is, the external surface 76 and the outer panel 18 may each be visible from the exterior of the vehicle 12.

Further, the external surface 76 of the casting 74 does not require masking. That is, the external surface 76 need not be hidden or otherwise obscured by an appliqué or other vehicle component. Rather, the external surface 76 is substantially free from an appliqué and may be classified as a "Class A" surface. As such, the B-pillar assembly 58 may minimize manufacturing complexity and/or vehicle weight. In addition, the casting 74 does not require additional processing steps after casting, other than an optional coating process, before final construction of the door assembly 10. For example, the casting 74 is not formed by extrusion and does not require trimming or milling to a reduced size before final assembly of the door assembly 10 and/or vehicle 12. Rather, the casting 74 is formed to an appropriate size during casting and thereby optimizes raw material utilization.

While the best modes for carrying out the disclosure have been described in detail, those familiar with the art to which this disclosure relates will recognize various alternative designs and embodiments for practicing the disclosure within the scope of the appended claims.

The invention claimed is:

1. A door assembly for a vehicle, the door assembly comprising:
    an outer panel configured for defining an exterior surface of the vehicle; and
    an inner panel matable to said outer panel to define a cavity therebetween, said inner panel including;
        a lower portion having a first longitudinal axis; and
        a B-pillar assembly extending from said lower portion and including;
            a casting having an external surface configured for defining said exterior surface of the vehicle, an internal surface spaced apart from said external surface, a length, and a second longitudinal axis;
    wherein said casting extends from said lower portion along said second longitudinal axis, and said second longitudinal axis is substantially perpendicular to said first longitudinal axis;
    wherein said casting is integrally-formed with said lower portion so that said casting is not separate from said lower portion.

2. The door assembly of claim 1, wherein said B-pillar assembly further includes a member configured for attaching to said internal surface along said length of said casting, and wherein said member is an extrusion.

3. The door assembly of claim 2, wherein said B-pillar assembly further includes a rivet integral with said casting.

4. The door assembly of claim 3, wherein said member receives said rivet and thereby attaches to said casting.

5. The door assembly of claim 1, further including a mirror mounting element extending from said lower portion, wherein said B-pillar assembly is spaced apart from said mirror mounting element to at least partially define a window opening.

6. The door assembly of claim 5, wherein said mirror mounting element is integral with said lower portion so that said mirror mounting element is not separate from said lower portion.

7. The door assembly of claim 5, wherein said mirror mounting element is triangular and has an edge disposed substantially parallel to said second longitudinal axis.

8. The door assembly of claim 5, further including a header configured for joining said mirror mounting element to said casting to thereby further define said window opening.

9. The door assembly of claim 8, wherein said header is curvilinear and interconnects said mirror mounting element and said casting.

10. The door assembly of claim 1, wherein said external surface and said outer panel together define said exterior surface of the vehicle.

11. The door assembly of claim 1, further including a coating disposed on said exterior surface.

12. A door assembly for a vehicle, the door assembly comprising:
    an outer panel configured for defining an exterior surface of the vehicle;
    an inner panel matable to said outer panel to define a cavity therebetween, said inner panel including;
        a lower portion having a first longitudinal axis;
        a mirror mounting element integral with and extending from said lower portion so that said mirror mounting element is not separate from said lower portion; and
        a B-pillar assembly extending from said lower portion and spaced apart from said mirror mounting element to at least partially define a window opening, said B-pillar assembly including;
            a casting integrally-formed with said lower portion so that said casting is not separate from said lower portion and having an external surface configured for defining said exterior surface of the vehicle, an internal surface spaced apart from said external surface, a length, and a second longitudinal axis;
    wherein said casting integrally extends from said lower portion along said second longitudinal axis, and said second longitudinal axis is substantially perpendicular to said first longitudinal axis; and
        a member configured for attaching to said internal surface along said length of said casting; and
        a header configured for joining said mirror mounting element to said casting to thereby further define said window opening.

13. The door assembly of claim 12, wherein said member is an extrusion.

14. The door assembly of claim 13, wherein said external surface and said outer panel together define said exterior surface of the vehicle.

15. A door assembly for a vehicle, the door assembly comprising:
    an outer panel configured for defining an exterior surface of the vehicle;
    an inner panel matable to said outer panel to define a cavity therebetween, said inner panel including;
        a lower portion having a first longitudinal axis;
        a mirror mounting element integral with and extending from said lower portion so that said mirror mounting element is not separate from said lower portion; and
        a B-pillar assembly extending from said lower portion and spaced apart from said mirror mounting element to at least partially define a window opening, said B-pillar assembly including;
            a casting integrally-formed with said lower portion so that said casting is not separate from said lower portion and having an external surface configured for defining said exterior surface of the vehicle, an internal surface spaced apart from said external surface, a length, and a second longitudinal axis;
    wherein said casting integrally extends from said lower portion along said second longitudinal axis, and said second longitudinal axis is substantially perpendicular to said first longitudinal axis;
    wherein said casting is not covered by an appliqué so that said external surface and said outer panel together define said exterior surface of the vehicle; and
        a member configured for attaching to said internal surface along said length of said casting so that said member and said casting together define a guide channel therebetween; and
        a header configured for joining said mirror mounting element to said casting to thereby further define said window opening.

* * * * *